G. H. RODWELL.
APPARATUS AND PROCESS FOR MAKING PULP ARTICLES.
APPLICATION FILED MAR. 11, 1916.
1,218,001.
Patented Mar. 6, 1917.
5 SHEETS—SHEET 1.
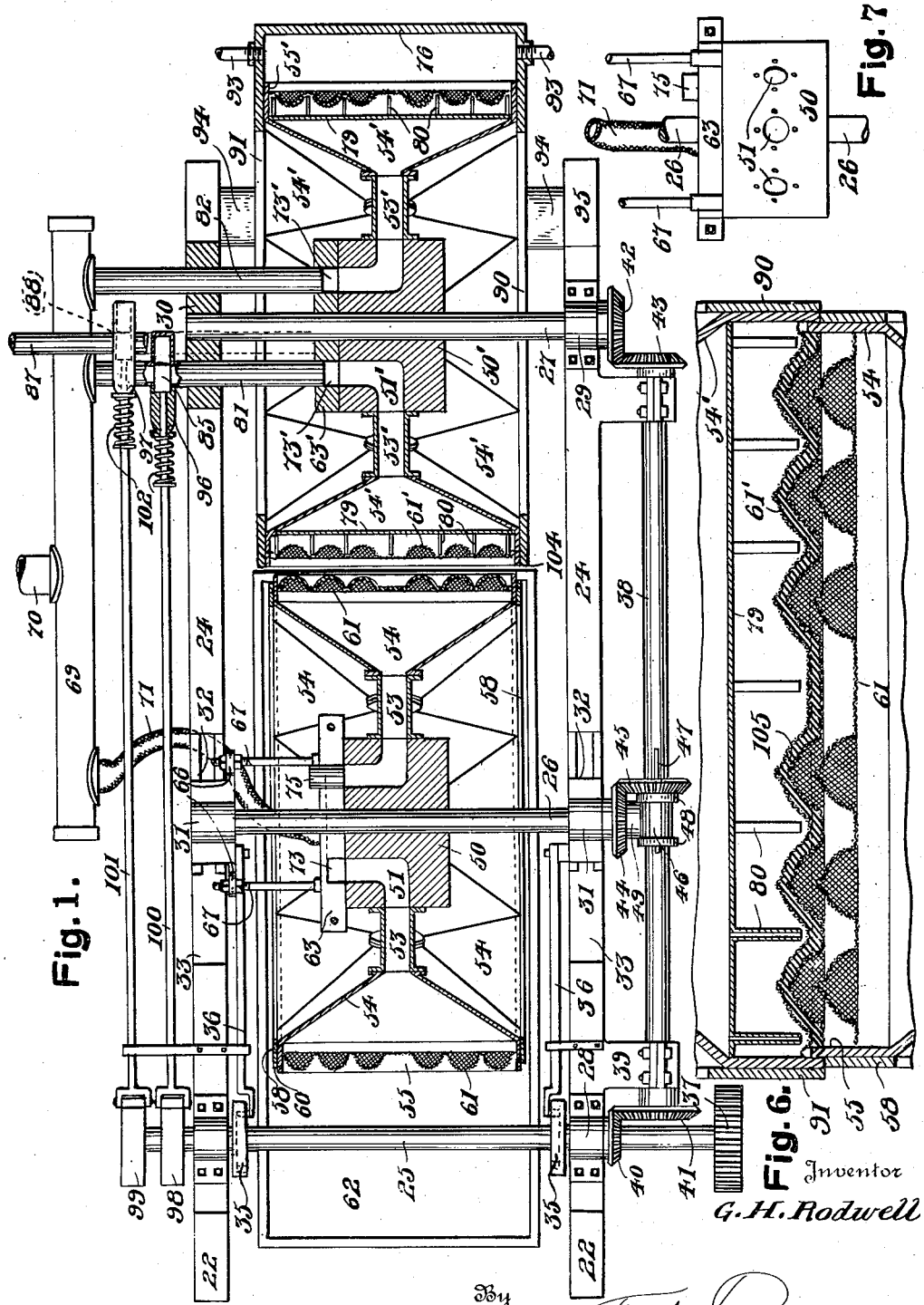

G. H. RODWELL.
APPARATUS AND PROCESS FOR MAKING PULP ARTICLES.
APPLICATION FILED MAR. 11, 1916.
1,218,001.
Patented Mar. 6, 1917.
5 SHEETS—SHEET 2.
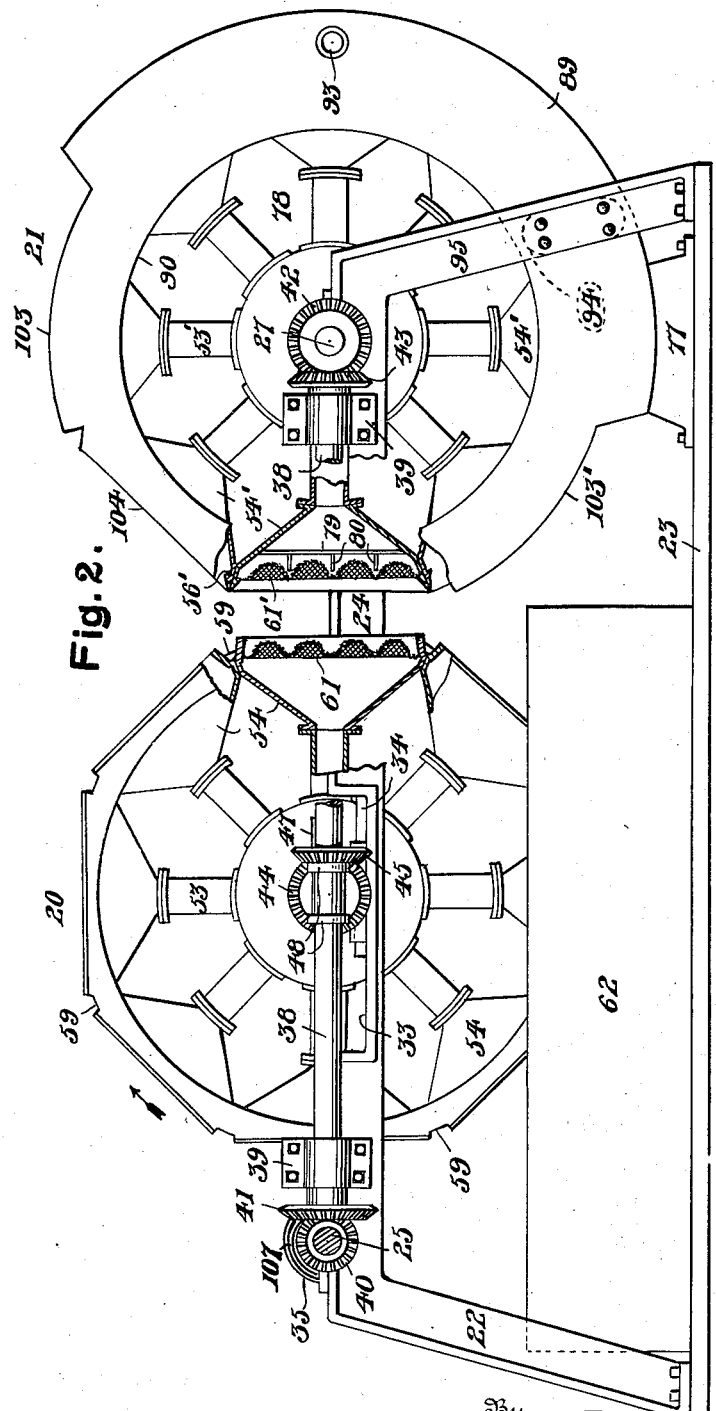
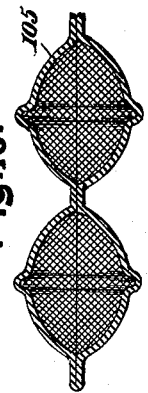
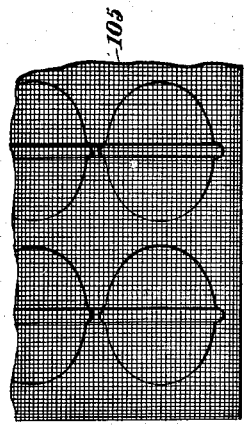
Inventor
G. H. Rodwell
By T. W. Bryant Attorney.

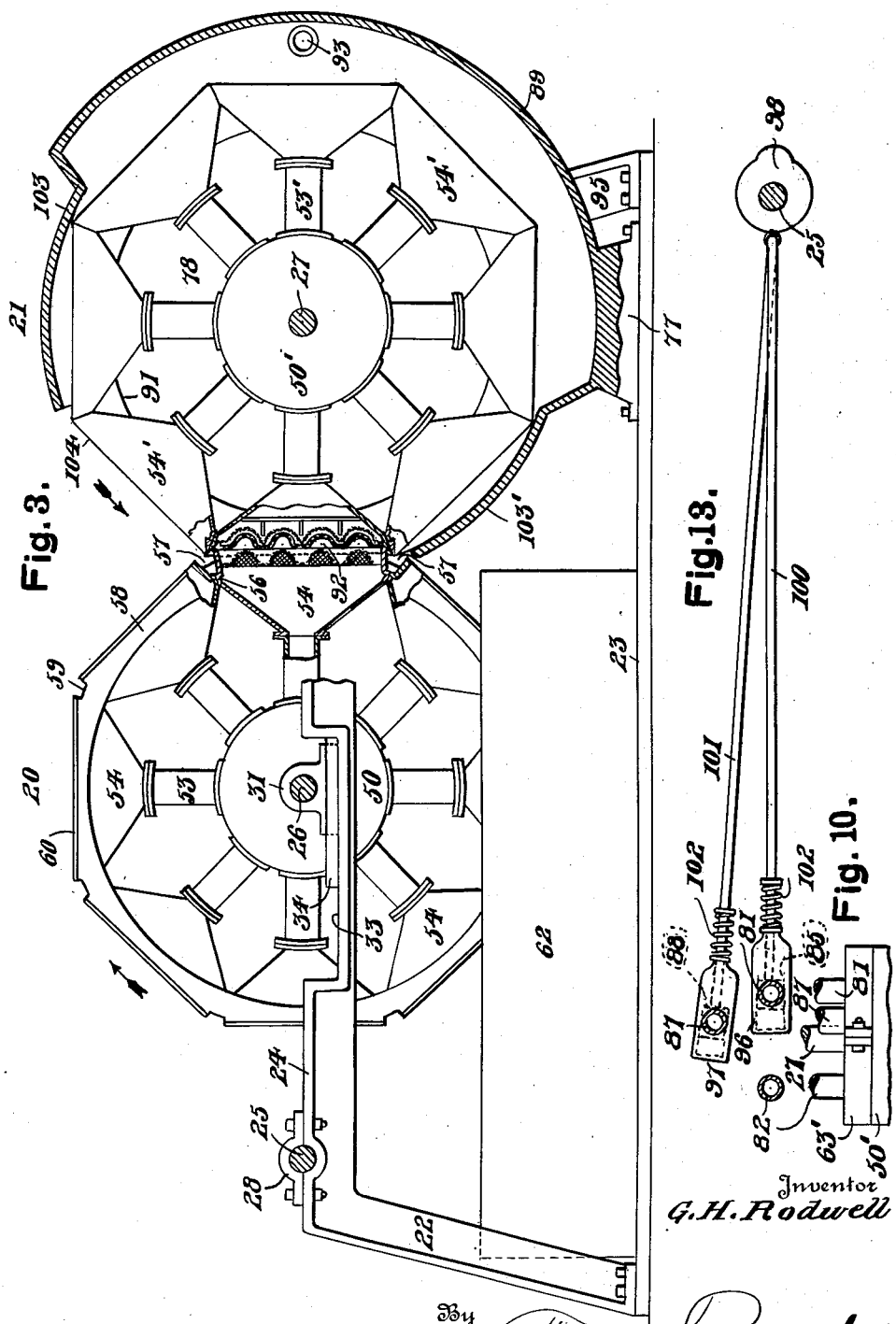

G. H. RODWELL.
APPARATUS AND PROCESS FOR MAKING PULP ARTICLES.
APPLICATION FILED MAR. 11, 1916.
1,218,001.
Patented Mar. 6, 1917.
5 SHEETS—SHEET 4.
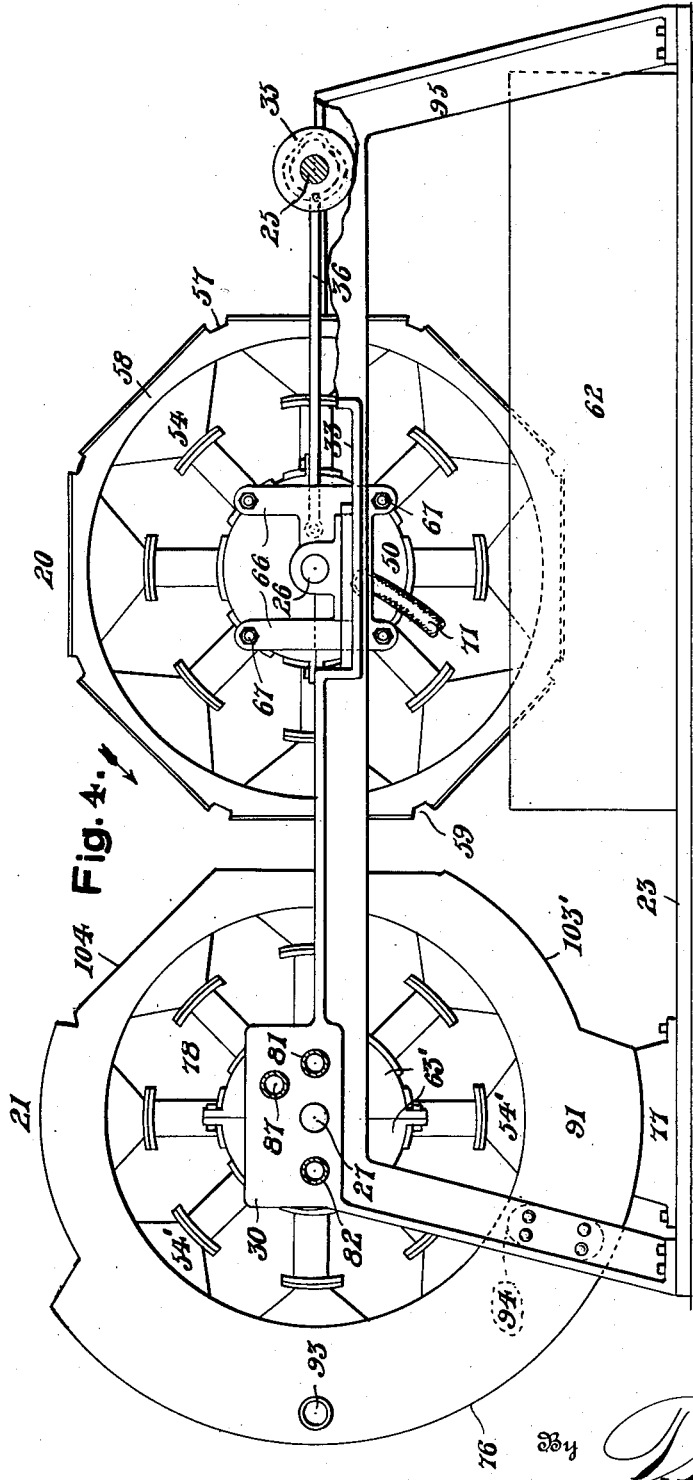
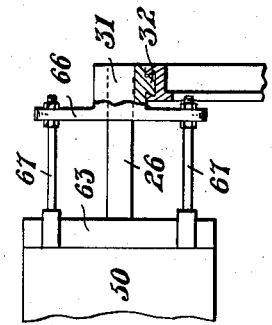
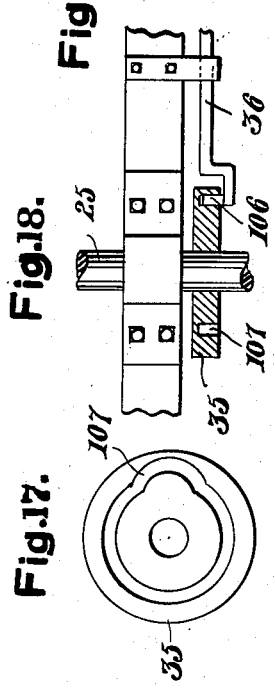
Inventor
G. H. Rodwell
By T. R. Bryant
Attorney.

G. H. RODWELL.
APPARATUS AND PROCESS FOR MAKING PULP ARTICLES.
APPLICATION FILED MAR. 11, 1916.
1,218,001.
Patented Mar. 6, 1917.
5 SHEETS—SHEET 5.
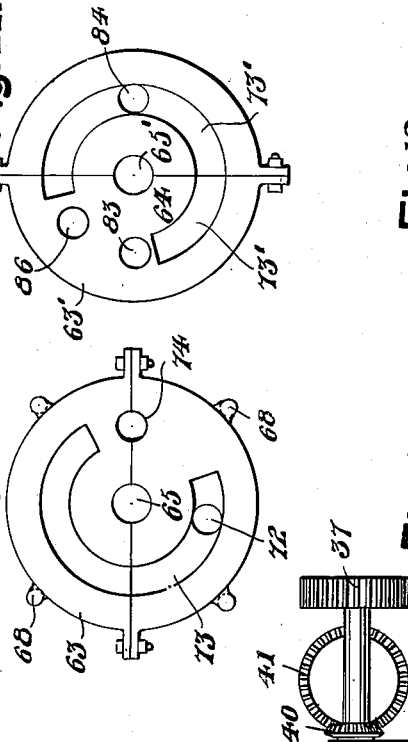
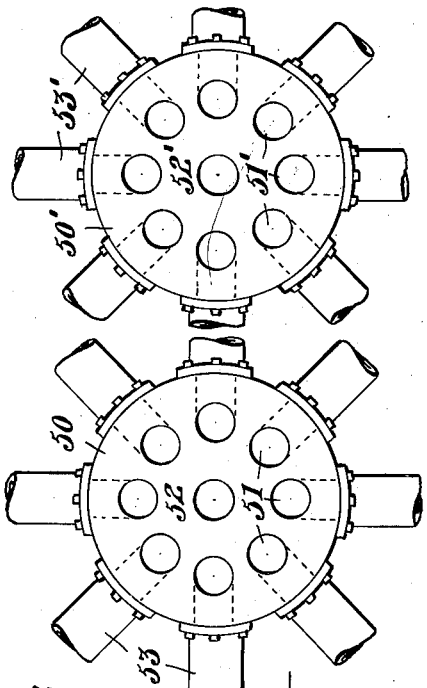
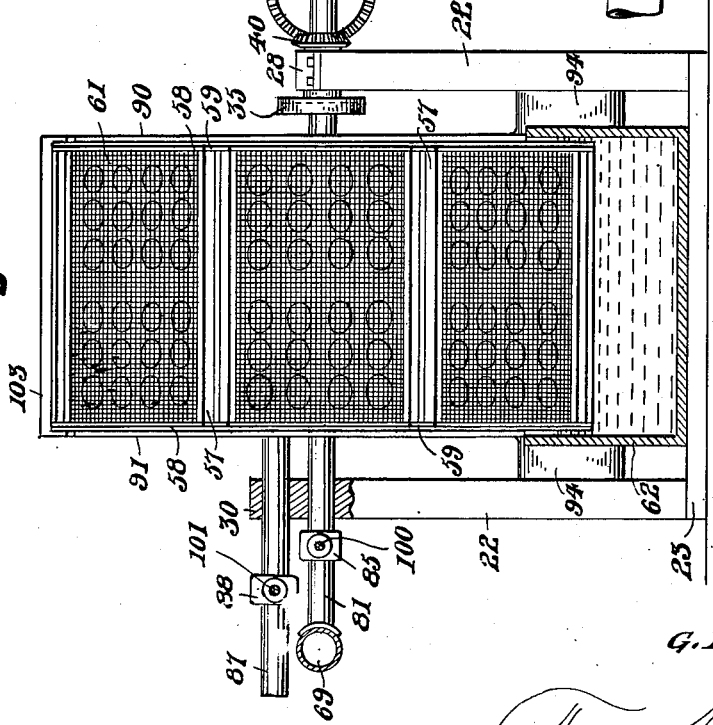
Inventor
G. H. Rodwell
By T. A. S. Bryant
Attorney

UNITED STATES PATENT OFFICE.

GEORGE H. RODWELL, OF NEWARK, NEW YORK, ASSIGNOR TO THE U. S. SAFETY EGG CARRIER CO. INC., OF NEWARK, NEW YORK, A CORPORATION OF NEW YORK.

APPARATUS AND PROCESS FOR MAKING PULP ARTICLES.

1,218,001. Specification of Letters Patent. Patented Mar. 6, 1917.

Application filed March 11, 1916. Serial No. 83,600.

*To all whom it may concern:*

Be it known that I, GEORGE H. RODWELL, a citizen of the United States of America, residing at Newark, in the county of Wayne and State of New York, have invented certain new and useful Improvements in Apparatus and Processes for Making Pulp Articles, of which the following is a specification.

This invention relates to new and useful improvements in apparatus and process for making pulp articles.

The primary object of the present invention is to render it possible to cheaply manufacture from pulp such articles as egg carriers and other cartons with great rapidity.

The present invention contemplates the provision of a process by which cartons such as egg carriers may be rapidly molded or formed by the continuous manipulation of pulp such as paper or wood pulp, a desirable quantity of the latter for a single article being taken up by suction and moved through a certain path of travel from its initial extraction from the pulp source of supply to its final expulsion by a fluid blast as a finished article, the article being thoroughly dried *in transitu* and a forcible transfer or jump of the article taking place during the travel thereof.

A further object of the invention is the provision of an apparatus for molding pulp articles by carrying out the above named process and for this purpose provides rotating mold face members arranged in plurality adapted for successive immersion in a pulp vat for the collection by suction of an article forming quantity of pulp upon each face, the apparatus providing a revolving member for receiving the pulp articles and extracting or expelling the moisture therefrom by superheated steam or other fluid and thereafter expelling the finished articles by compressed air or other fluid blast.

The invention further contemplates a separate collecting and drying wheel each arranged with complementally formed mold faces upon the adjacently positioned peripheries thereof, automatically operated valves being arranged for each of the said faces, whereby a suction port and an atmospheric port are brought in communication with the faces of the collecting wheel for picking up the pulp and releasing the same at timed intervals, while the faces of the drying wheel are provided with suction ports and a compressed air or dry steam port with which they are required to communicate for receiving the partially formed pulp article from the collecting wheel, then drawing or forcing a dry heating fluid therethrough and lastly expelling a finished article from each face of the drying wheel.

A special feature of my improved apparatus which latter broadly consists of a collecting and a drying wheel is the bodily shifting movement imparted to the collecting wheel for successively approaching each of its purality of pulp covered faces toward successive ones of the complementally formed faces of the drying wheel, such corresponding faces of the two wheels being constantly separated and the partially formed pulp article upon the face of the collecting wheel being released therefrom and forced to bodily transfer or jump to the adjacently positioned receiving faces of the drying wheel by means of accurately controlled suction ports carried by the latter.

A further feature of my apparatus is the provision of an arcuate drying drum adapted to be filled with superheated steam or other desirable dry heating fluid, the pulp article carrying faces of the drying wheel passing through the said drying drum with such faces in communication with controlled suction ports, whereby the heated fluid is drawn through the pulp articles and faces of the drying wheel, effecting a thorough drying of the articles into a finished serviceable and substantially stable article, ready to be removed from the wheel for actual use. I provide a process for the rapid manufacture of cartons and hollow-ware articles from paper pulp and an apparatus for completely carrying out such process to the final production of a finished article from pulp, the apparatus being operable from a single power shaft for the complete operation of rotating and oscillating the pulp collecting wheel and for rotating the drying wheel, the control of suction, atmospheric and compressed fluid ports for communication with the article being formed, being operable by mechanism simultaneously with the movement of the said wheels.

The present invention being both a process and an apparatus, it will be understood that the apparatus herein illustrated and described is only one form of means by which the said process may be carried out.

With these general objects in view and others that will appear as the nature of the invention is better understood, the same consists in the novel combination and arrangement of parts hereinafter fully described, illustrated in the accompanying drawings and then claimed.

In the drawings forming a part of this application and in which like designating characters refer to corresponding parts throughout the several views:—

Figure 1 is a central horizontal sectional view taken through the device, parts being broken away, the collecting unit being partially shifted.

Fig. 2 is a side elevation thereof partially broken away, with the collecting unit retracted.

Fig. 3 is a longitudinal vertical sectional view taken through the device, with units engaged.

Fig. 4 is an elevational view of the opposite side of the machine from that shown in Fig. 2.

Fig. 5 is a front elevation of the device partially shown in vertical transverse section.

Fig. 6 is an enlarged detail horizontal sectional view of the coöperating mold faces in their closed position.

Fig. 7 is a side elevation of the valve controlling means for the collecting wheel, parts being removed.

Fig. 8 is an interior plan view of the stationary valve disk employed with the collecting wheel.

Fig. 9 is an end elevational view of the ported hub of the collecting wheel.

Fig. 10 is a side elevation of the valve disk and a portion of the adjacent members of the drying wheel.

Fig. 11 is an interior plan view of the valve disk of the drying wheel.

Fig. 12 is an end elevation of the ported hub of the drying wheel.

Fig. 13 is a detail view of a sliding controlling means for the drying wheel.

Fig. 14 is a detail view partly in section of one of the slidable mountings for the collecting wheel.

Figs. 15 and 16 are fragmentary views of one of the completed pulp articles, and Figs. 17 and 18 are elevational and sectional views respectively of one of the grooved cams.

The present invention consisting of a process for the manufacture of articles from pulp and including one form of apparatus for carrying out the process, the apparatus and process will now be specifically described, it being first pointed out that the same broadly consists in collecting pulp upon a plurality of mold faces by a means, such as the collecting unit or wheel 20 herein illustrated and then transferring the same for the purpose of drying the articles which is accomplished in the present apparatus by the drying unit or wheel 21.

A support for the mechanism and wheels consists of oppositely arranged frames 22 mounted upon a suitable base 23 and being oppositely-arranged thereon in substantial parallelism with their top rails 24 in the same horizontal plane and adapted for journaling transversely thereon the forwardly positioned power shaft 25 and axles or shafts 26 and 27 of the collecting and drying units respectively. The said shafts 25, 26 and 27 are arranged parallel to each other in the same horizontal plane, the power shaft 25 being journaled in the opposite rails 24 by means of bearings 28, while the rearwardly arranged drying unit shaft 27 is journaled in a similar bearing 29 at one side of the machine and through a substantially rectangular vertically extending block 30 carried by one of the side rails 24 at the opposite side of the machine. The collecting unit axle 26 is journaled in bearing blocks 31 which have sliding connections 32 with the opposite frame rails 24 at a U-shaped depression 33 formed at opposite points in the rails 24 and supplied with ways or ribs 34 upon which the said blocks 31 are slidably mounted. Grooved cams 35 are secured to the power shaft 25 at points adjacent and inwardly of the bearings 28 and are operatively connected by means of rods 36 with the bearing blocks 31 of the collecting unit shaft 26 and whereby as will be evident, the shaft 26 will be reciprocated forwardly and rearwardly during each rotation of the power shaft 25. A roller 106 is journaled upon the forward end of each rod 36, operably positioned in the groove 107 of the adjacent cam 35.

The power shaft 25 constitutes the driving shaft for the apparatus and is provided with a power gear 37 at one end thereof whereby the outer shaft 25 is operated by any suitable source of power supply. A driven shaft 38 is arranged longitudinally at one side of the frame rail 24 and adjacent the power gear 37 and shaft 25, being journaled in brackets 39 projecting laterally from the said side rail. The driving shaft 25 is provided with a small pinion 40 secured thereto which is in constant mesh with a relatively large pinion 41 secured to the adjacent end of the driven shaft 38 and whereby the shaft 38 is adapted to be driven at one-eighth of the speed of the driving shaft 25 in the present illustrated arrangement, it being understood that the driving shaft 25 must perform a complete revolution for each separate mold face with which the units 20 and 21 are provided. The shafts 27 and 38 are provided with equal-sized meshing pinions 42 and 43 respectively, while similar equal-sized meshing pinions 44 and 45 are carried respectively by the collecting unit shaft 26 and the driven shaft 38. The pinion 45 and its hub 46 are slidably splined to the shaft 38 as at 47, the said hubs 46 having opposite collars 48 for freely receiving the revolving hub extension 49 of the pinion 44 and thereby providing a sliding movement of the pinion 45 coincident with the reciprocations of the collecting unit shaft 26 simultaneously with the turning of the collecting unit by means of the pinions 44 and 45.

The collecting unit 20 hereinbefore stated as mounted upon the reciprocatingly journaled shaft or axle 26, consists of a cylindrical hub 50 provided with a plurality of angular ports 51 which outlet at one side face 52 of the said hub and also centrally of the periphery of the hub. A plurality of tubular spokes 53 project radially from the hub 50 overlying and in communication with the outer ends of the said ports 51, while hollow flaring funnel-shaped heads 54 are outwardly carried by the spokes 53, the said heads having projecting rectangular marginal flanges 55 carried thereby and connected at their adjacent base portions as at 56 for forming a connecting rim or felly portion for the collecting wheel unit 20. Any desired number of spokes and heads may be thus arranged for the collecting unit 20 carried by the hub 50 thereof, eight of the heads 54 being provided in the present embodiment of the apparatus. The requirement for the rectangular arrangement for the flanges 55 of the heads 54 of the octagonal wheel unit 20 provides a transverse space 57 between each of the adjacent head flanges. A binding or strengthening annulus 58 is carried on opposite sides of the collecting wheel 20 secured to the side flanges 55 of the heads 54 and having cut-away portions 59 corresponding in position to the afore-mentioned spaces 57, the outer edges 60 of the annuli 58 being arranged eight in number corresponding to the adjacent side flanges 55 and being of slightly less height than the said flanges to the free edges of which they are arranged parallel, thus forming side shoulders for each of the heads 54. The rectangular flange 55 will therefore extend to regular height around the four sides of each head 54, while the annulus edges 60 will provide shoulders outwardly of the outer side flanges of the said head 54. The spaces 57 and cut-away portions 59 will arrange the rectangular head flanges in projecting relations to the collecting wheel unit 20 as best illustrated in Figs. 2 and 3 of the drawings.

The head flanges 54 are provided with foraminous mold faces 61 suspended transversely within the flanges 55 and adapted for immersion within a pulp tank or vat 62 arranged beneath the collecting unit 20 and whereby the mold face 61 of each of the heads 54 is successively immersed and a pulp coating drawn thereon during each revolution of the collecting unit carried by the shaft 26.

A valve disk or head 63 is provided for the collecting unit 20 being mounted against rotation and with its inner face 64 in flat frictional engagement with the ported hub face 52, the shaft 26 freely revolving through the central opening 65 of the said head 63. The block 31 adjacent the head 63 is provided with vertically-arranged parallel arms 66 to which inwardly extending rods 67 are rigidly secured at points adjacent the opposite ends of the said arms, while the inner ends of the rod 67 are rigidly mounted in peripheral posts 68 of the said head 63 and whereby the latter is rigidly restrained against revolutions. A suction or vacuum head 69 is arranged outwardly of the frame 22 at the side of the machine and upon which the head 63 is located and has the air exhausted therefrom by a connecting pipe 70, it being understood that a vacuum pump (not shown) is operatively attached to the said pipe 70. A flexible hose 71 connects the suction head 69 with a vacuum port 72 arranged through the lower side of the valve disk 63, it being noted that the face 64 of the said vacuum disk is provided with an arcuate vacuum channel 73 communicating with the said port 72, and being nearly circular in form upon the said disk face 64.

With the collecting unit 20 operatively positioned as herein illustrated, the revolving of the shaft 26 and collecting unit 20 in the direction indicated by the arrow in Fig. 2, brings the port 51 of each succeeding head 54 in communication with the suction channel 73 as each head becomes submerged in the vat 62, the suction upon the head drawing the pulp from the vat 62 upon the mold faces 61 of the heads, said suction continuing until the head emerges from the tank 62, and throughout the upward arcuate path of travel of the head 54 until such head approximately reaches its rearmost position.

By these means, the mold faces 61 will be successively coated with soft pulp in sufficient quantities to form a pulp article upon the mold head conforming to the shape of the latter, the suction at such times also assisting in the partial extraction of moisture from the pulp coating through the interstices of the mold faces 61. An atmospheric port 74 is provided through the valve disk 63 slightly spaced from the rear end of the vacuum channel 73 and upon the horizontal diameter of the disk 63 as best illustrated in Fig. 8 of the drawings, the said port 74 being open to atmosphere and preferably provided with an outlet collar 75. When the port 51 of each head 54 is successively brought into horizontal alinement with the said atmospheric port 74, the suction from the channel 73 has already been broken by the passing of such port 51 beyond the rear end of the channel 73 to the communication of the port 51 with the atmospheric inlet 74 which admits air of atmospheric pressure to the head 54, thus in effect releasing the partially formed pulp article upon the mold face 61 by reason of the sudden change of tension within the head 54 rearwardly of such article from a partial vacuum to normally atmospheric pressure.

The drying unit 21 is positioned rearwardly of the collecting unit 20, being normally slightly separated therefrom and having no reciprocatory movements and consisting mainly of a heating or drying drum 76 mounted stationary upon the base 23 by means of a sub base 77 and a wheel 78 secured to the shaft 27 for revolving within the drum 76.

The drying wheel 78 is formed similar to the collecting wheel 20 in that it provides a hub 50' having radial spokes 53' terminating outwardly in heads 54' arranged with marginal flanges 55' forming substantially rectangular rims upon the heads, the said rims being connected together at their contacting edges as at 56'.

Foraminous mold faces 61' are arranged in each head 54' spanning the rim 55' of each, while inwardly of the mold faces 61' is arranged a perforated partition plate 79 having a plurality of tubes 80 registering with each perforation of the plate and extending to points adjacent the mold face 61'.

A stationary valve head or disk 63' is provided for its inner face 64' in frictional flat engagement with the adjacent face 52' of the hub 50' the said hub having angular ports 51' connecting the said face 52' with the tubular spokes 50'. The shaft 27 is freely journaled through a central opening 65 of the valve disk 63', while vacuum pipes 81 and 82 are secured in engagement with the valve disk 63' registering within opposite suction ports 83 and 84 respectively of the said valve disk and arranged in the same horizontal plane as the shaft 27, the pipes 81 and 82 being extended through and secured to the aforementioned frame block 30 and having their outer ends capped into the suction head 69. The suction port 83 communicates directly with the disk face 64' which is controlled by a slide valve 85 in the afore-mentioned suction pipe 81, while the opposite suction port 84 enters a suction channel 73' which extends substantially three-fourths of the distance around the said face 64 in an arcuate path and terminates at one end slightly spaced from the afore-mentioned suction port 83 and at its other end slightly spaced from a farther port 86 in the disk head 63' arranged in a plane slightly above and adjacent the plane of the vacuum port 83. A compressed air or dry steam pipe 87 communicates with the port 86 and extends through the frame block 30 being controlled by a suitable slide valve 88, the disk head 63' being rigidly secured to the inner ends of the said pipes 81', 82 and 87 and whereby the said head is mounted stationary in its operative position; it being understood that any suitable air compressor or dry steam pressure plant (not shown) is attached to the compressed fluid pipe 87.

The drying drum 76 heretofore referred to is of hollow circular form having substantially its rear lower half enlarged and closed by a similar circular back plate 89, the wheel 78 revolving between the opposite sides 90 and 91 of the drum 76 for heating and drying the formed article 92 in its passage through the rear enlarged portion thereof, communicating pipes 93 being tapped into such drum portion for supplying a drying fluid thereto such as superheated steam or hot air, it being noted that the opposite flanges or portions of the rims 55' move in flat alinement with the inner faces of the drum sides 90 and 91, while interposed packing may be provided if found desirable.

The heads 54' are equal in number to the heads 54 of the collecting wheel, here being shown as eight in number, the rims 55' of which are of slightly greater dimensions than the rims of the heads 54 formed by the flanges 55 of the latter, so that the projecting ends of the heads 54 of the collecting unit 20 are receivable within the rims 55' of the heads 54' of the drying unit 21 as best illustrated in Figs. 3 and 6 of the drawings, such inter-relations taking place at each rearmost positioning of the collecting unit 20 and occurring for each of the eight relatively arranged pairs of complementally formed mold faces 61 and 61', the said faces however being at all times separate and a considerably greater distance apart than the thickness of the article 92. Strengthening webs 94 are arranged between the rear legs 95 of the frame members 22 and the adjacent side of the enlarged portion of the drying drum 76.

The afore-mentioned slide valves 85 and 88 controlling the direct suction pipe 81 and the compressed fluid pipe 87 respectively are of similar arrangement being slidably positioned within fluid-tight casings 96 and 97 carried respectively by the said pipes 81 and 87. Separate cam members 98 and 99 are arranged respectively for operating the slide valves 85 and 88, the said cams being mounted side by side upon the opposite end of the power shaft 25 from the power gear 37, while cam rods 100 and 101 respectively connect the members 98 and 99 with the said slide valves 85 and 88. Return springs 102 for closing the valves 81 and 87 are carried by the said rods 100 and 101 for operative engagement with the slide valve casings 96 and 97. The drum sides 90 and 91 are provided with outer lower marginal cover plates 103 and 103′ at the opposite ends of the enlarged drying portion of the drum, while the forward edge of the said side plates is squared as at 104 adapted for bringing the heads 54′ in alinement therewith, the upper one of said squared portions 104 lying adjacent the plate 103 forming an outlet mouth through which the finished article is forcibly impelled by compressed air or dry steam from the pipe 87, while the lower portion accommodates the heads 54′ and successively at time intervals for the reception of the partially formed pulp articles 92 from the mold forms 61 of the collecting unit heads 54. It will be understood that the form of the articles 92 made upon the present apparatus by my process may be in the form of foldable egg cartons 105 as best illustrated in Figs. 15 and 16 of the drawings, while cartons and other hollow paper ware and articles of different form may be made by changing the configuration of the mold faces 61 and 61′.

In operation, the collecting unit 20 is revolved at the same speed as the drying wheel 21, while the collecting unit is forced to reciprocate upon the ways 34 as heretofore fully described and whereby each head 54 of the collecting unit is received successively by the heads 54′ of the drying unit during the simultaneous revolutions of the two units. The mold faces 61 of the collecting unit 20 having received a coating of the pulp from the vat 62 during their movement therethrough as heretofore described, the partially saturated and partially formed articles 92 are released from the said mold faces 61 and transferred when such faces are brought in juxtaposition with respect to the mold faces 61′ of the drying unit 21 as illustrated in Fig. 3 of the drawings, the same being accomplished by the admission of air under atmospheric pressure through the atmospheric port 74 into the carrying head 54. At the time of such inter-engagement of the respective heads 54 and 54′, the slide valve 85 is quickly opened by means of the cam member 98 and its connecting rod 100 and the sudden application of vacuum resulting from communication established between the suction pipe 81 and the head 54′ results in drawing the article 92 across the intervening gap between the slightly separated mold faces 61 and 61′ after the manner of a quick jump, the said article being then received and temporarily retained by suction upon the mold face 61′. The inner end of the port 51′ for the head 54′ for receiving the pulp article 92 is then brought into communication with the suction channel 73′, the suction from each channel coming from the suction head 69 not only retains the partially formed article upon the mold head 61′, during the rotation of the wheel 78 through the drying portion of the drum 76, and until such head 54′ passes beneath the top plate 103 of the drying drum to the outlet mouth 104, but also draws the drying fluid within the drum 76 through the partially formed article 92 and through the mold face 61′ by means of the tubes 80, thus drying the articles by drawing the heated fluid therethrough as well as by contacting the articles with such fluid within the enlarged drying portion of the drum. It is also possible to reverse this operation by outwardly forcing a drying fluid through the article 61′ of the heads 54′ from the passages 51′—53′.

When the wheel 78 is so positioned, the head 54′ carrying the then-dried article 92 at the outlet mouth 104 of the drying drum, the port 51′ of this particular head 54′ is brought into registry with the compressed air or dry steam port 86 of the disk 63′ and at which time the slide valve 88 of the compressed air or dry steam pipe 87 is suddenly opened by means of the afore-mentioned cam member 99 and its connecting rod 101. This sudden blast of air or dry steam pressure within the head 54′ passing through pipes 80, which equalize the pressure from the blast over the surface of the article on the face 61′, forcibly ejects or blows off the finished article 92 from the drying mold face 61′, the article being in its finished condition and substantially of the form illustrated by the fragmentary portion thereof in Fig. 15 of the drawing and shown in its folded closed relations in Fig. 16 thereof.

It will be understood that the slide valves 85 and 88 are normally closed during the revolutions of the drier wheel 78, the operation of the said valves being accurately timed by the proper positioning of the cam members 98 and 99 upon the power shaft 25 and the return springs 104 on the rods 100 and 101, to open simultaneously whenever a head 54′ of the said wheel 78 reaches a position alining with the cut-away straight portion 104 of the drier casing and whenever a head 54′ of said wheel 78 reaches a position with respect to a mold face 61 as illustrated in Figs. 3 and 6. In other words, the valves 85 and 88 open respectively the suction of the compressed air or dry steam pipes 81 and 87, when one of the heads 54′ is positioned for the reception of a partly finished article 92 and the next succeeding head 54′ of the wheel 78 is arranged thereabove at the outlet mouth 104 of the drum ready for expulsion by the air or dry steam blast from the pipe 87, through the small equalizing tubes 80. It will be seen that the heads 54' are each subjected to a constant suction from the suction pipe 82 from the time the head leaves its receiving position for the partly formed article 92 from the collecting head 54, (see Fig. 3) until the same passes entirely through the drying drum 76 and reaches the aforementioned outlet point for the expulsion of the finished article as at 104 adjacent to and forwardly of the top plate 103.

Both faces of the finished article 105 will have slightly roughened appearance by reason of the foraminous formation of the mold faces 61 and 61' and the article 92 would be rendered more compact and firm by reason of its forced jump or sudden bodily transfer from the face 61 to the face 61' by reason of the impact upon the reception of such article 92 upon the mold face 61' and whereby the finished article after being dried by its passage through the heating drum 76 is enhanced in value by reason of its strength and rigidity. The supply of drying fluid through the pipes 93 may remain constant during the operation of the apparatus which may be continuous or varied by any desirable means if required. It will thus be apparent that by placing a desirable amount of fluid pulp within the tank 62, that the apparatus may be set in operation by communicating power to the power gear 37 and that with only the usual attention, the complete operation of manufacture of the finished pulp articles will be rapidly accomplished. The ports 51 of the hub 50 of the collecting unit 20 will be automatically controlled for receiving the pulp upon the mold faces 61 and then releasing the same by means of the valve disk 64, while the automatic control of the ports 51' of the hub 50' of the drying wheel 78 is accomplished by the accurately-timed slide valves 85 and 88 and the valve disk 63, the coöperating reciprocations of the collecting unit 20 being also arranged and accurately timed with respect to the operations of the port controlling means, all as hereinbefore specifically mentioned.

While the form of the invention herein shown and described is what is believed to be the preferred embodiment thereof, it is nevertheless to be understood that minor changes may be made therein without departing from the spirit and scope of the invention as claimed.

What I claim as new is:—

1. A pulp article forming machine, comprising a revoluble collecting unit, foraminous mold faces upon said unit, automatically controlled suction and atmospheric communicating means for said faces, simultaneously operable reciprocating means for said unit, and a receiving drying unit revolubly mounted adjacent said collecting unit.

2. A pulp article forming machine, comprising a frame, a pulp tank within said frame, and a reciprocating collecting unit revolubly journaled upon the said frame and projecting within said tank.

3. A pulp article forming machine, comprising a frame, a pulp tank within said frame, a reciprocating collecting unit revolubly journaled upon the said frame and projecting within said tank, foraminous mold faces upon said unit, a stationary valve disk, and connections between said disk and faces whereby suction is applied to said faces and the same is connected to the atmosphere at predetermined intervals.

4. A pulp article forming machine, comprising a frame, a pulp tank within said frame, a reciprocating collecting unit revolubly journaled upon the said frame and projecting within said tank, reciprocating means for said unit, and a receiving drying unit oppositely revoluble with respect to said collecting unit and journaled upon the said frame.

5. A pulp article forming machine, comprising a frame, a pulp tank within said frame, a collecting unit revolubly journaled upon the said frame and extending into said tank, foraminous mold faces upon said unit, a stationary valve disk, connections between said disk and faces whereby suction is applied to said faces and the same is connected to the atmosphere at predetermined intervals, reciprocating means for said unit, and a receiving drying unit oppositely revoluble with respect to said collecting unit and journaled upon the said frame.

6. A pulp article forming machine, comprising a frame, a pulp tank within said frame, a reciprocating collecting unit revolubly journaled upon the said frame and projecting within said tank, foraminous mold faces upon said unit, a stationary valve disk, connections between said disk and faces whereby suction is applied to said faces and the same is connected to the atmosphere at predetermined intervals, reciprocating means for said unit, and a receiving drying unit oppositely revoluble with respect to said collecting unit and journaled upon the said frame.

7. Apparatus for forming articles from pulp comprising a reciprocatingly mounted revolubly journaled collecting mold unit, a drying drum, and an article carrying wheel revolubly journaled within said drum.

8. Apparatus for forming articles from pulp comprising a reciprocatingly mounted revolubly journaled collecting mold unit, a drying drum, an article carrying wheel revolubly journaled within said drum, the said wheel being oppositely revoluble with respect to said unit, and receiving members upon said wheel successively positioned within the horizontal line of travel of the said unit during the reciprocations thereof.

9. Apparatus for forming articles from pulp comprising a reciprocatingly mounted revolubly journaled collecting mold unit, a drying wheel, and receiving members upon said wheel successively positioned within the horizontal line of travel of the said unit during the reciprocations thereof.

10. Apparatus for forming articles from pulp comprising a reciprocatingly mounted revolubly journaled collecting mold unit, a drying drum, an article carrying wheel revolubly journaled within said drum, a suction member for said unit and wheel, and a single automatically controlled releasable connection between said suction member and unit.

11. Apparatus for forming articles from pulp comprising a reciprocatingly mounted revolubly journaled collecting mold unit, a drying drum, an article carrying wheel revolubly journaled within said drum, the said wheel being oppositely revoluble with respect to said unit, receiving members upon said wheel successively positioned within the horizontal line of travel of the said unit during the reciprocations thereof, a suction member for said unit and wheel, and a single automatically controlled releasable connection between said suction member and unit.

12. Apparatus for forming articles from pulp comprising a reciprocatingly mounted revolubly journaled collecting mold unit, a drying wheel, receiving members upon said wheel successively positioned within the horizontal line of travel of the said unit during the reciprocations thereof, a suction member for said unit and wheel, and a single automatically controlled releasable connection between said suction member and unit.

13. Apparatus for forming articles from pulp comprising a reciprocatingly mounted revolubly journaled collecting mold unit, a drying drum, an article carrying wheel revolubly journaled within said drum, a plurality of automatically controlled connections between said suction member and said wheel, and a valve-controlled compressed fluid article ejector for the said wheel.

14. Apparatus for forming articles from pulp comprising a reciprocatingly mounted revolubly journaled collecting mold unit, a drying drum, an article carrying wheel revolubly journaled within said drum, the said wheel being oppositely revoluble with respect to said unit, receiving members upon said wheel successively positioned within the horizontal line of travel of the said unit during the reciprocations thereof, a plurality of automatically controlled connections between said suction member and said wheel, and a valve-controlled compressed fluid article ejector for the said wheel.

15. Apparatus for forming articles from pulp comprising a reciprocatingly mounted revolubly journaled collecting mold unit, a drying wheel, receiving members upon said wheel successively positioned within the horizontal line of travel of the said unit during the reciprocations thereof, a plurality of automatically controlled connections between said suction member and said wheel, and a valve-controlled compressed fluid article ejector for the said wheel.

16. Apparatus for forming articles from pulp comprising a reciprocatingly mounted revolubly journaled collecting mold unit, a drying drum, an article carrying wheel revolubly journaled within said drum, a suction member for said unit and wheel, a single automatically controlled releasable connection between said suction member and unit, a plurality of automatically controlled connections between said suction member and said wheel, and a valve-controlled compressed fluid article ejector for the said wheel.

17. Apparatus for forming articles from pulp comprising a reciprocatingly mounted revolubly journaled collecting mold unit, a drying drum, an article carrying wheel revolubly journaled within said drum, the said wheel being oppositely revoluble with respect to said unit, receiving members upon said wheel successively positioned within the horizontal line of travel of the said unit during the reciprocations thereof, a suction member for said unit and wheel, a single automatically controlled releasable connection between said suction member and unit, a plurality of automatically controlled connections between said suction member and said wheel, and a valve-controlled compressed fluid article ejector for the said wheel.

18. Apparatus for forming articles from pulp comprising a reciprocatingly mounted revolubly journaled collecting mold unit, a drying wheel, receiving members upon said wheel successively positioned within the horizontal line of travel of the said unit during the reciprocations thereof, a suction member for said unit and wheel, a single automatically controlled releasable connection between said suction member and unit, a plurality of automatically controlled connections between said suction member and said wheel, and a valve controlled compressed fluid article ejector for the said wheel.

19. An apparatus for making articles from pulp comprising a revoluble collecting unit having heads, pulp-receiving mold faces upon said heads, a suction member, connections between said suction member and said heads, an article drying unit, and valve means for said connections whereby the suction within each of said heads is successively broken upon the engagement of the heads separately with said drying unit, the said collecting unit being reciprocatingly mounted and such engagements occurring at the limit of the successive movements of said unit.

20. A pulp article forming machine comprising a reciprocating collecting unit having pulp-receiving mold faces, a drying unit having faces complementally formed with respect to said mold faces, the said respective faces being of the same dimensions oppositely positionable in spaced relations, and means adapted for the forcible transfer of the partially formed articles from said mold faces to said drying unit faces during the operation of the machine.

21. A pulp article forming machine comprising a collecting unit having pulp-receiving mold faces, a drying unit having article carrying faces, the said respective faces being oppositely positionable in spaced relations a greater distance apart than the thickness of the articles formed by the machine, and article releasing means for said mold faces and suction means for said drying unit faces whereby partially formed articles are caused to jump with a solidifying impact from said mold faces to the said drying unit faces.

22. The process of making articles from pulp, consisting in collecting a desired quantity of fluid pulp in the required formation by means of suction, releasing the suction upon such pulp quantity, then transferring with a stabilizing impact of the said pulp quantity by means of suction and the drying of the pulp quantity into a completed article by the passing of heated fluid therethrough.

23. A pulp article forming machine comprising a revolubly mounted collecting unit, simultaneously operable reciprocating means for said unit and a coöperating drying means operatively arranged adjacent the said reciprocating unit.

In testimony whereof I affix my signature.

GEORGE H. RODWELL.